United States Patent [19]
Boesch

[11] 3,876,413
[45] Apr. 8, 1975

[54] HERBICIDAL OXADIAZOLONE DERIVATIVES

[75] Inventor: Roger Boesch, Vitry, France

[73] Assignee: Rhone-Poulenc S.A., Paris, France

[22] Filed: Nov. 5, 1973

[21] Appl. No.: 412,958

Related U.S. Application Data

[62] Division of Ser. No. 258,309, May 31, 1972, Pat. No. 3,818,026.

[30] Foreign Application Priority Data

June 2, 1971   France .............................. 71.19980

[52] U.S. Cl. .................................................. 71/92
[51] Int. Cl. ............................................ A01n 9/22
[58] Field of Search ......................................... 71/92

[56] References Cited
UNITED STATES PATENTS

| | | | |
|---|---|---|---|
| 3,385,862 | 5/1968 | Metivier et al. | 260/307 |
| 3,632,599 | 1/1972 | Zschocke et al. | 260/307 |
| 3,741,977 | 6/1973 | Boesch et al. | 260/307 A |

*Primary Examiner*—Lewis Gotts
*Assistant Examiner*—Catherine L. Mills
*Attorney, Agent, or Firm*—Stevens, Davis, Miller & Mosher

[57] ABSTRACT

Oxadiazolone derivatives of the formula:

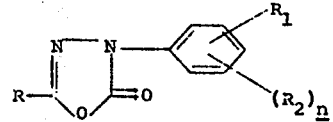

wherein R is alkyl of 1 through 4 carbon atoms or alkenyl of 2 through 4 carbon atoms, $R_1$ is alkynyloxy of 3 or 4 carbon atoms, $R_2$ is halogen or alkynyloxy of 3 or 4 carbon atoms, and $n$ is zero or an integer from 1 through 4, possess herbicidal properties and are especially useful for combatting grasses.

11 Claims, No Drawings

HERBICIDAL OXADIAZOLONE DERIVATIVES

This is a division of application Ser. No. 258,309. filed May 31, 1972, now U.S. Pat. No. 3,818,026.

This invention relates to new oxadiazolone derivatives, to processes for their preparation and to herbicidal compositions containing them.

In the specification of British Pat. No. 1,063,799 entitled "Oxadiazolone Compounds and Herbicidal Compositions Containing Them" granted to Rhone-Poulenc S.A. on an application filed Dec. 11, 1964, there is described and claimed 5-butyl-3-phenyl-2-oxadiazolone of the formula:

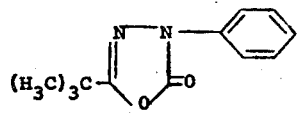

and corresponding oxadiazolones in which the phenyl ring carries one or more substituents selected from halogen atoms, alkyl and alkoxy groups containing from 1 to 4 carbon atoms, and the nitro group. These oxadiazolone compounds possess herbicidal properties and are useful for combatting graminaceous and dicotyledonous weeds, for example Panicum, crabgrass, foxtail, pigweed, mayweed and dandelion, in crops such as rice, carrot, cabbage, pea, broad bean and maize.

It has now been found as a result of research and experimentation that oxadiazolones similar to those mentioned above in which the phenyl ring carries at least one alkynyloxy group containing 3 or 4 carbon atoms and optionally one or more halogen atoms, and the 5-position of the oxadiazole ring carries any alkyl group containing 1 to 4 carbon atoms or an alkenyl group containing 2 to 4 carbon atoms, possess herbicidal properties superior to the oxadiazolone derivatives specifically described in British Pat. No. 1,063,799, and are especially useful for combatting grasses which constitute parasitic plants amongst useful food crops.

The new oxadiazolone derivatives of the present invention are, accordingly, those of the general formula:

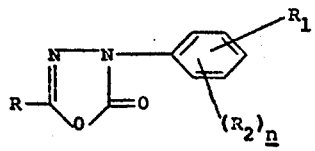

wherein R represents a straight- or branched-chain alkyl group containing 1 to 4 carbon atoms or an alkenyl group containing 2 to 4 carbon atoms, $R_1$ represents an alkynyloxy group containing 3 or 4 carbon atoms (preferably propargyloxy), $R_2$ represents a halogen (preferably chlorine) atom or an alkynloxy group containing 3 or 4 carbon atoms (preferably propargyloxy), and $n$ represents zero or an integer from 1 to 4 inclusive. When $n$ represents 2,3 or 4, the additional atoms or groups present on the phenyl ring may be the same or different.

Preferred oxadiazolone derivatives of the present invention are those of the formula:

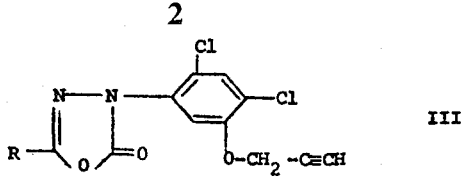

wherein R is as hereinbefore defined.

The following experiments show the herbicidal activity of the oxadiazolone derivatives of this invention in comparison with that of 5-t-butyl-3-(2,4-dichlorophenyl)-1,3,4-oxadiazol-2-one which is the best of the compounds disclosed in the above-mentioned British patent.

PRE-EMERGENCE EXPERIMENTS IN POTS

Seeds of various species [wheat (*Triticum sativum*), lentil (*Lens culinaris*), radish (*Raphanus sativus*), kitchen garden beet (*Beta vulgaris*) and blackgrass (*Alopecurus agrestis*)] are sown in definite number at the surface of soil contained in plastic pots and composed of a mixture of equal parts of loose earth, compost and river sand. 1 cc. of a solution of the product to be studied is sprayed uniformly on the surface of the soil of each pot. The seeds are then covered with untreated soil and left to germinate under fluorescent tubes at a temperature of 22° to 24°C. for 20 days. The number and the height of the plants in each pot are then measured and compared with those of the controls (plants which received distilled water instead of the solution of the product to be studied).

Taking account of the percentage of living plants and of their average growth relative to the controls, the herbicidal activity is rated according to the following scale:

| Rating | Percentage activity |
|--------|---------------------|
| 0      | 90–100              |
| 1      | 80–90               |
| 2      | 60–80               |
| 3      | 40–60               |
| 4      | 20–40               |
| 5      | 0–20                |

POST-EMERGENCE EXPERIMENTS IN POTS

Young plants of various species (wheat, lentil, radish, beet and blackgrass), carrying two leaves or having reached the stage of cotyledonous leaves depending on the species, are placed in pots and their average height is noted. These plants are then sprayed with solutions of the products to be studied at the desired concentration (1cc. per pot). The pots, treated in this way, are placed in a greenhouse at a temperature of 22° to 24°C. for 20 days. The percentage of living plants and their average growth relative to the controls (plants which received distilled water) are then recorded.

Taking account of the percentage of living plants and of their average growth relative to the controls. the herbicidal activity is rated according to the scale given above.

The solutions of active product used in these experiments were prepared in the following way:

1. The finely ground active product (400 mg.) is suspended in a solution containing acetone (5 cc.), Tween 80 (50 mg.) and distilled water containing 1 part per 1,000 of Scurol 0 (40 cc.)

2. This suspension is diluted with water containing 1 part per 1,000 of Scurol 0 in order to obtain solutions, the use of which under the conditions indicated (1 cc. per pot) corresponds to the application of 1 kilogram of active product per hectare.

The experiments were carried out with the following products:

3-(2,4-dichloro-5-propargyloxy-phenyl)-5-t-butyl-1,3,4-oxadiazol-2-one (product A)

3-(2,4-dichloro-5-propargyloxy-phenyl)-5-allyl-1,3,4-oxadiazol-2-one (product B)

3-(2,4-dichloro-5-propargyloxy-phenyl)-5-propyl-1,3,4-oxadiazol-2-one (product C)

3-(2,4-dichloro-5-propargyloxy-phenyl)-5-isopropyl-1,3,4-oxadiazol-2-one (product D).

The results are recorded in the following Tables:

TABLE 1

| Product | PRE-EMERGENCE | | | | |
|---------|---------------|---|---|---|---|
|  | Wheat | Lentil | Radish | Beet | Blackgrass |
| A | 2 | 0 | 2 | 2 | 0 |
| B | 4 | 3 | 3 | 2 | 1 |
| C | 4 | 1 | 4 | 4 | 0 |
| D | 2 | 0 | 1 | 1 | 0 |
| Comparison product | 4 | 1 | 3 | 2 | 1 |

TABLE 2

| Product | POST-EMERGENCE | | | | |
|---------|----------------|---|---|---|---|
|  | Wheat | Lentil | Radish | Beet | Blackgrass |
| A | 1 | 0 | 0 | 0 | 0 |
| B | 3 | 2 | 3 | 1 | 0 |
| C | 1 | 0 | 3 | 0 | 0 |
| D | 1 | 0 | 0 | 0 | 0 |
| Comparison product | 2 | 3 | 3 | 1 | 1 |

According to a feature of the invention, the new oxadiazolone derivatives of general formula II are prepared by the process which comprises reacting phosgene with a hydrazide of the general formula:

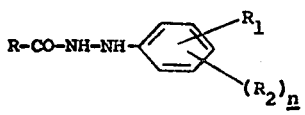

IV wherein R, $R_1$, $R_2$ and n are as hereinbefore defined.

The reaction is generally carried out in an inert organic solvent at a temperature between 20° and 120°C. As the organic solvent there may be used, for example, an aromatic hydrocarbon such as benzene or toluene, or an ether such as a dialkyl ether, e.g. diethyl ether, or dioxan.

The hydrazides of general formula IV can be obtained by reacting an acid of the general formula:

R—COOH

V (wherein R is as hereinbefore defined), or a derivative thereof such as a halide or the anhydride, with a hydrazine of the general formula:

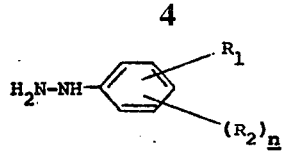

VI wherein the various symbols are as hereinbefore defined. The reaction is generally carried out in an inert organic solvent such as methylene chloride or dimethylformamide, optionally in the presence of water.

The hydrazines of general formula VI can be obtained from an aniline of the general formula:

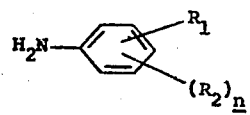

VII (wherein the various symbols are as hereinbefore defined) by diazotization followed by reduction of the resulting diazonium salt using, for example, stannous chloride.

According to a further feature of the invention, the oxadiazolone derivatives of general formula II are prepared by the process which comprises reacting an alkynyl halide of the general formula:

$R_3$—X

VIII (wherein $R_3$ represents an alkynyl group containing 3 or 4 carbon atoms and X represents a halogen, e.g. chlorine, atom) with an oxadiazolone derivative of the general formula:

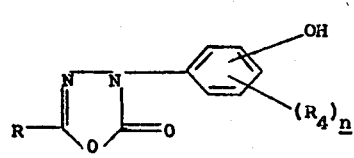

IX wherein $R_4$ represents a halogen atom or hydroxy radical, and R and n are as hereinbefore defined.

The reaction is generally carried out in an inert organic solvent, such as acetonitrile, preferably at the boiling point of the reaction mixture and in the presence of an alkaline condensation agent such as potassium carbonate.

The oxadiazolone derivatives of general formula IX can be obtained a. from oxadiazolone derivatives of the general formula:

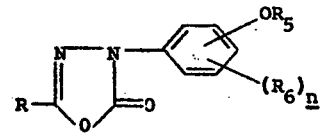

X (wherein $R_5$ represents an alkyl group containing 1 to 4 carbon atom $R_6$ represents a halogen atom or an alkoxy group containing 1 to 4 carbon atoms, and R and n are as hereinbefore defined) by any known method for converting an alkoxy group to a hydroxy radical without affecting the rest of the molecule.

The oxadiazolone derivatives of general formula x can be obtained by application of the process described in British Patent Specification No. 1,063,799.

b. by reacting phosgene with a hydrazide of the general formula:

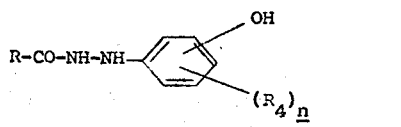

wherein the various symbols are as hereinbefore defined.

The hydrazides of general formula XI can be obtained according to the methods heretofore described for the preparation of hydrazides of general formula IV.

According to a further feature of the present invention, there are provided herbicidal compositions containing, as the active ingredient, at least one oxadiazolone derivative of general formula II in association with one or more diluents compatible with the oxadiazolone(s) and suitable for use in agricultural herbicidal compositions. These compositions can optionally contain other compatible pesticides, such as herbicides, insecticides or fungicides. Preferably the compositions contain between 0.005 and 80% by weight of oxadiazolone compound(s).

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the oxadiazolone compound with the solid diluent, or by impregnating the solid diluent with a solution of the oxadiazolone compound in a volatile solvent, evaporating the solvent, and if necessary grinding the product so as to obtain a powder.

Instead of a solid diluent, there may be used a liquid in which the oxadiazolone compound is dissolved or dispersed. The compositions may thus take the form of suspensions, emulsions or solutions in organic or aqueous-organic media, for example aromatic hydrocarbons such as toluene or xylene, ketones such as acetophenone, or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required, the oxadiazolones may be used in the form of self-emulsifying concentrates containing the active substance dissolved in the emulsifying agent or in a solvent containing an emulsifying agent compatible with the oxadiazolone and solvent, a simple addition of water to such concentrates producing compositions ready for use.

According to another feature of the invention, a method of controlling the growth of weeds at a locus comprises applying to the locus a herbicidally-effective quantity of at least one oxadiazolone derivative of general formula II. The oxadiazolone may be applied to a crop-growing area, the amount of applied oxadiazolone then being sufficient for control of the weed, e.g. grasses, but insufficient to cause substantial damage to the crop. The dosage can vary in accordance with the nature of the weed or weeds to be controlled, the crop and the desired effect. In general, taking into account these factors, dosages of oxadiazolone compound(s) of 0.25 to 5 kg. per hectare give good results, for example in the control of Panicum in a rice crop, or Setaria or Digitaria in maize.

The following Examples illustrate the preparation of oxadiazolone derivatives of the present invention.

EXAMPLE 1

1-Trimethylacetyl-2-(2,4-dichloro-5-propargyloxy-phenyl)-hydrazine (22 g.) is added to a 20% solution (103 cc.) of phosgene in toluene. The mixture is then gradually heated to the reflux temperature and maintained there until the evolution of gas ceases. After cooling, the filtered solution is concentrated under reduced pressure (25 mm.Hg) at 55°C. On recrystallisation of the residual solid from ethanol, 3-(2,4-dichloro-5-propargyloxy-phenyl)-5-t-butyl-1,3,4-oxadiazol-2-one (20.5 g.), melting at 134°C., is obtained.

The initial 1-trimethylacetyl-2-(2,4-dichloro-5-propargyloxy-phenyl)-hydrazine (m.p. 144°C.) can be obtained by reacting trimethylacetic anhydride with 2,4-dichloro-5-propargyloxy-phenylhydrazine in methylene chloride. 2,4-Dichloro-5-propargyloxy-phenylhydrazine (m.p. 130°C.) can be obtained by reacting sodium nitrite with 2,4-dichloro-5-propargyloxy-aniline in hydrochloric acid ($d = 1.18$) followed by reducing the diazonium salt so formed by means of stannous chloride.

2,4-Dichloro-5propargyloxy-aniline (m.p. 89°C) can be prepared by reducing the corresponding nitro derivative by means of iron in aqueous ethanol.

2,4-Dichloro-5-propargyloxy-nitrobenzene (m.p. 64°C.) can be prepared by condensing propargyl chloride with 2,4-dichloro-5-nitro-phenol in refluxing acetonitrile in the presence of potassium carbonate.

EXAMPLE 2

A mixture of 3-(2,4-dichloro-5-hydroxy-phenyl)-5-t-butyl-1,3,4-oxadiazol-2-one (429 g.), propargyl chloride (137 g.) and potassium carbonate (195.5 g.) in acentonitrile (2830 cc.) is heated under reflux, with stirring, for 3 hours 30 minutes. After cooling, the inorganic salts are separated by filtration and the organic solution is concentrated to dryness under reduced pressure (15 mm.Hg) at 50°C. The residue is taken up in chloroform (3540 cc.) and the solution obtained is washed with water (700 cc.), dried over sodium sulphate and then concentrated to dryness under reduced pressure (15mm.Hg) at 40°C. The residue is dried at 40°C. under reduced pressure (15 mm.Hg) until its weight is constant. 3-(2,4-Dichloro-5-propargyloxy-phenyl)-5-t-butyl-1,3,4,-oxadiazol-2-one (483.5 g.), melting at 131°C., is thus obtained. After recrystallisation from heptane, the product melts at 134°C.

3-(2,4-Dichloro-5-hydroxy-phenyl)-5-t-butyl-1,3,4-oxadiazol-2-one (m.p. 132°C.) used as starting material can be prepared by the cyclisation by means of phosgene of 1-trimethylacetyl-2-(2,4-dichloro-5-hydroxyphenyl)-hydrazine (m.p. 222°C.) in a toluenedioxan mixture under reflux.

1-Trimethylacetyl-2-(2,4-dichloro-5-hydroxyphenyl)-hydrazine can be obtained by reacting trimethylacetic anhydride with 2,4-dichloro-5-hydroxyphenylhydrazine (m.p. 215°C.) in dimethylformamide in the presence of trimethylacetic acid and water.

2,4-Dichloro-5-hydroxy-phenylhydrazine can be prepared from 2,4-dichloro-5-hydroxy-aniline (m.p. 137°C.) by diazotisation followed by reduction of the resulting diazonium salt using stannous chloride.

EXAMPLE 3

Following the procedure of Example 1 but starting with 1-isobutyryl-2-(2,4-dichloro-5-propargyloxyphenyl)-hydrazine (15 g.) and a 2.% solution (73.5 cc.) of phosgene in toluene, there is obtained after recrystallisation of the product from ethanol 3-(2,4-dichloro-5-propargyloxy-phenyl)-5-isopropyl-1,3,4-oxadiazol-2-one (9.8 g.), melting at 96°C.

1-Isobutyryl-2-(2,4-dichloro-5-propargyloxyphenyl)-hydrazine (m.p. 162°C.) used as starting material can be obtained by reacting isobutyryl chloride with 2,4-dichloro-5-propargyloxy-phenylhydrazine in benzene in the presence of triethylamine.

Following the same procedure and using appropriate starting materials of general formula IV, the following products are prepared:

3-(2,4-dichloro-5-propargyloxy-phenyl)-5-allyl-1,3,4-oxadiazol-2-one, melting at 68°C., and
3-(2,4-dichloro-5-propargyloxy-phenyl)-5-propyl-1,3,4-oxadiazol-2-one, melting at 52°C.

The following Examples illustrate herbicidal compositions according to the invention:

EXAMPLE 4

To 1,000 g. of 3-(2,4-dichloro-5-propargyloxyphenyl)-5-t-butyl-1,3,4-oxadiazol-2-one are added 100 g. of a wetting agent obtained by the condensation of ethylene oxide (10 moles) with octylphenol (1 mole). This mixture is then dissolved in a mixture containing equal volumes of acetophenone and toluene. The volume of the solution is made up to 2,000 cc. with the same solvent mixture. This solution may be employed, after dilution to 1,000 litres with water, to combat, for example, Panicum in rice crops. The dilute solution obtained is sufficient to treat one hectare of crop.

EXAMPLE 5

Following the procedure of Example 4 but using 3-(2,4-dichloro-5-propargyloxy-phenyl)-5-isopropyl-1,3,4-oxadiazol-2-one, a composition is obtained which is suitable for combatting grasses.

I claim:

1. A herbicidal composition which comprises, as active ingredient, an oxadiazolone of the formula:

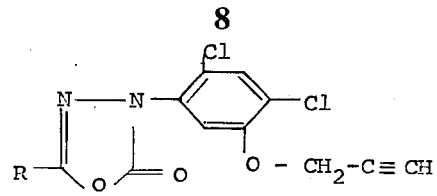

wherein R is alkyl of 1 through 4 carbon atoms or alkenyl of 2 through 4 carbon atoms, in association with a diluent compatible with said oxadiazolone and suitable for use in a herbicidal composition, the quantity of said oxadiazolone in said composition bein a herbicidally effective amount from 0.005 to 80% by weight of said composition.

2. A composition according to claim 1 in which the oxadiazolone is 3-(2,4-dichloro-5-propargyloxyphenyl)-5-t-butyl-1,3,4-oxadiazol-2-one.

3. A composition according to claim 1 in which the oxadiazolone is 3-(2,4-dichloro-5-propargyloxyphenyl)-5-isopropyl-1,3,4-oxadiazol-2-one.

4. A composition according to claim 1 in which the oxadiazolone is 3-(2,4-dichloro-5-propargyloxyphenyl)-5-allyl-1,3,4-oxadiazol-2-one.

5. A composition according to claim 1 in which the oxadiazolone is 3-(2,4-dichloro-5-propargyloxyphenyl)-5-propyl-1,3,4-oxadiazol-2-one.

6. A method of controlling the growth of weeds at a locus which comprises applying to the locus a herbicidally-effective quantity of an oxadiazolone of the formula:

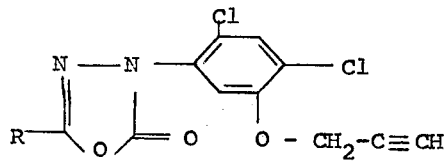

wherein R is alkyl of 1 through 4 carbon atoms or alkenyl of 2 through 4 carbon atoms.

7. A method according to claim 6 in which the said oxadiazolone is applied to the locus so as to give 0.25 to 5 kg. of said oxadiazolone per hectare.

8. A method according to claim 6 in which said oxadiazolone is 3-(2,4-dichloro-5-propargyloxy-phenyl)-5-t-butyl-1,3,4-oxadiazol-2-one.

9. A method according to claim 6 in which said oxadiazolone is 3-(2,4-dichloro-5-propargyloxy-phenyl)-5-isopropyl-1,3,4-oxadiazol-2-one.

10. A method according to claim 6 in which said oxadiazolone is 3-(2,4-dichloro-5-propargyloxy-phenyl)-5-allyl-1,3,4-oxadiazol-2-one.

11. A method according to claim 6 in which said oxadiazolone is 3-(2,4-dichloro-5-propargyloxy-phenyl)-5-propyl-1,3,4-oxadiazol-2-one.

* * * * *